March 4, 1930.  H. S. ALBRECHT  1,749,056
MEASURING DEVICE
Filed May 10, 1926    3 Sheets-Sheet 1

Inventor:
Herman S. Albrecht,
by Rippey & Kingsland,
His Attorneys.

March 4, 1930.　　H. S. ALBRECHT　　1,749,056
MEASURING DEVICE
Filed May 10, 1926　　3 Sheets-Sheet 2

Inventor:
Herman S. Albrecht,
by Rippey & Kingsland.
His Attorneys.

March 4, 1930.    H. S. ALBRECHT    1,749,056
MEASURING DEVICE
Filed May 10, 1926    3 Sheets-Sheet 3

Inventor:
Herman S. Albrecht,
by Rippey & Kingsland.
His Attorneys.

Patented Mar. 4, 1930

1,749,056

UNITED STATES PATENT OFFICE

HERMAN S. ALBRECHT, OF ST. LOUIS, MISSOURI

MEASURING DEVICE

Application filed May 10, 1926. Serial No. 108,196.

This invention relates to measuring devices, and consists in the novel construction hereinafter disclosed.

An object of the invention is to provide a measuring or feeding device whereby material is fed from a hopper in measured quantities and intermittently advanced to the point of use.

Another object of the invention is to provide a measuring or feeding device including a hopper, a measuring chamber, gates admitting the material to the measuring chamber and discharging it therefrom, and mechanism whereby the gates are intermittently operated so as to feed measured quantities of the material upon timed or intermittent intervals.

Additional objects of the construction will be apparent from the following detailed description thereof, taken in connection with the accompanying drawings, in which, Fig. 1 is a plan view.

Fig. 4 is a detail view of one of the operating rods.

Figure 1:
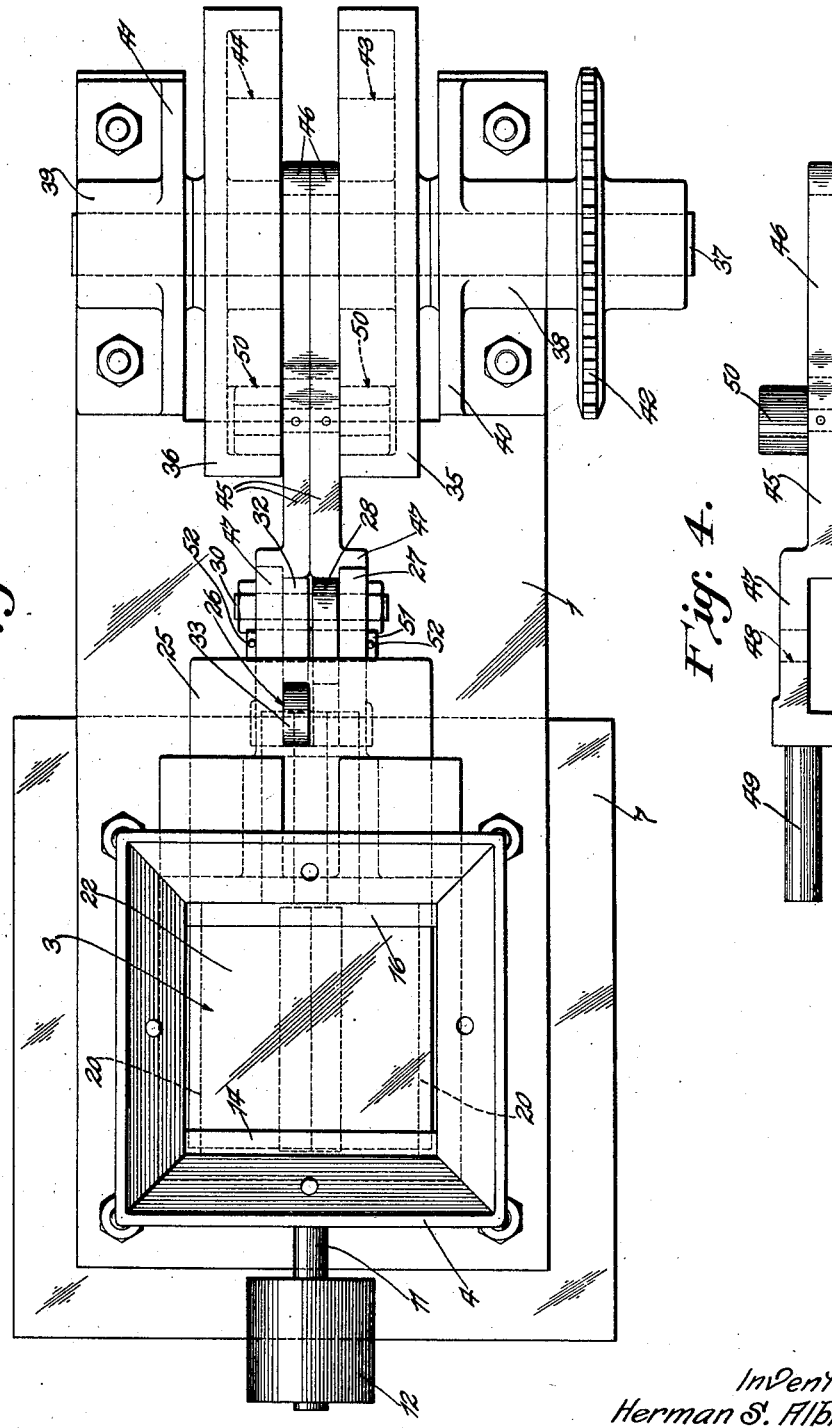
Figure 2:
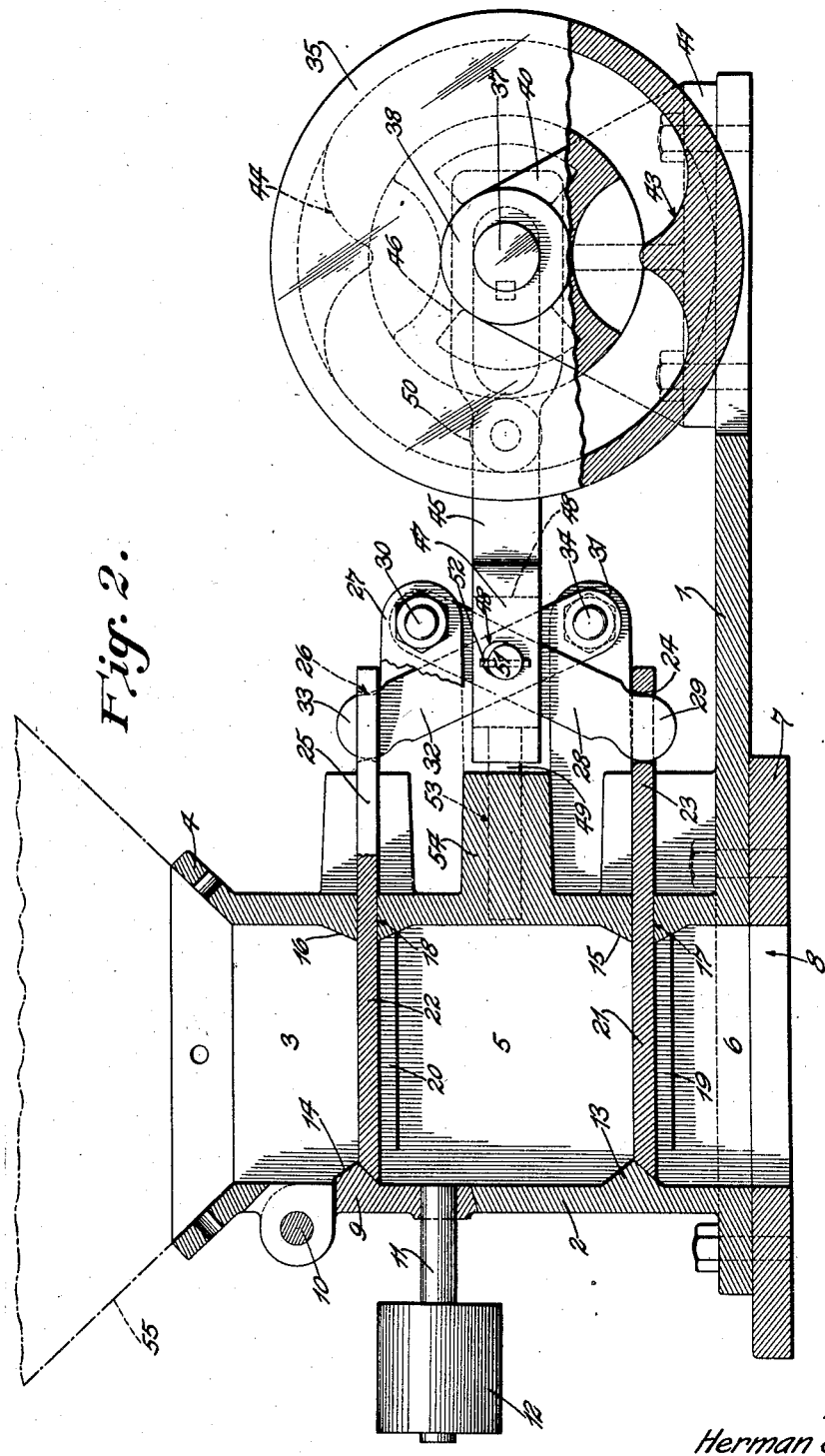
Fig. 2 is a vertical elevation partially in section.
Figure 3:
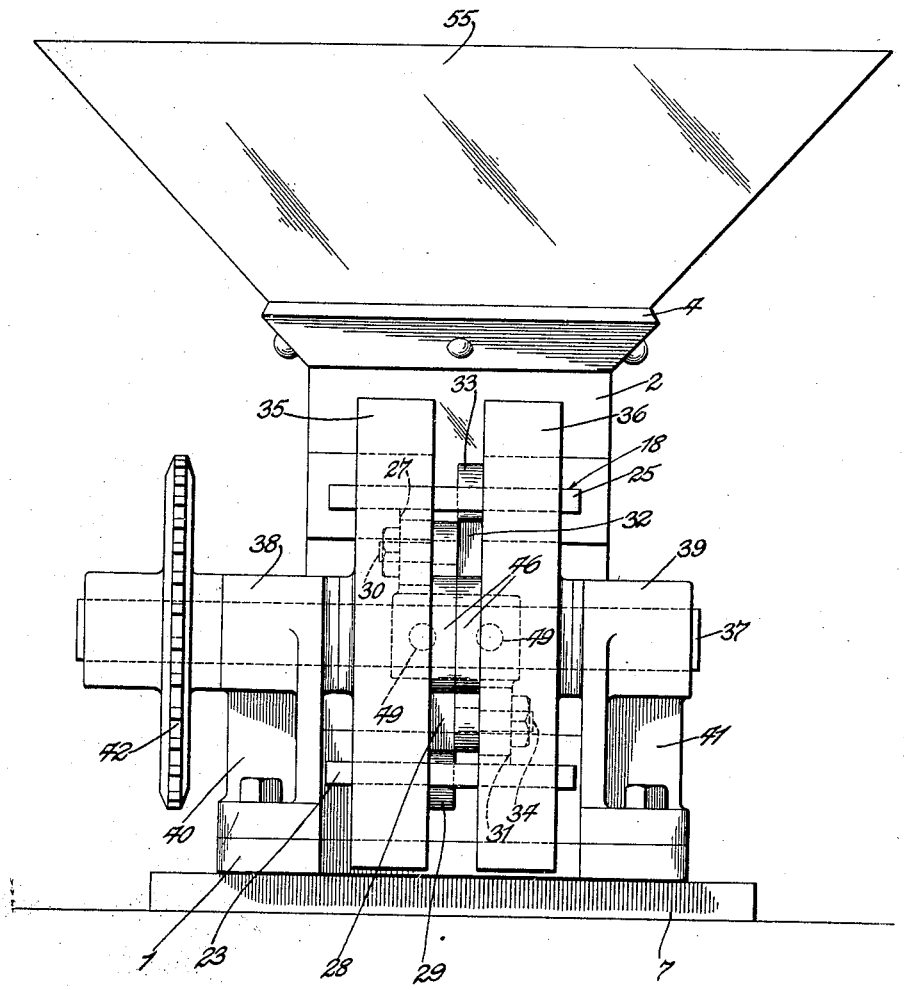
Fig. 3 is an end view.

In the embodiment of the invention illustrated in the drawings, the device consists of a main casting comprising a base 1 which supports a housing 2, which is divided into a delivery chute 3 having outwardly flaring flange walls 4; a measuring chamber 5 and a delivery passage 6. The base is secured to a permanent support 7 in which there is an opening 8 that communicates with the point of use. The device may be used for feeding any kind of material, but is appropriately designed for feeding fuel to a furnace which is suitably positioned in relation to the opening 8 to receive the material that is discharged through said opening.

A portion 9 of the side wall of the casting between the delivery chute and the measuring chamber is transversely separated and the upper portion is hinged to the wall of the delivery chute at 10. An outwardly extending arm 11 is connected with the lower portion of the hinged wall 9 and carries at its outer extremity a heavy weight 12, the tendency of which is to hold the wall 9 in closed position. The wall 9 constitutes an outwardly opening gate that yields to excessive outward pressure to prevent breakage of the parts if the material jams and also provides access to the measuring chamber to break up any accumulated mass that may form therein.

At the base of the measuring chamber and formed on the outer wall of the housing is an angular flange 13 running entirely across the wall and upon the wall 9 is a similar flange 14. Opposite the flanges 13 and 14 respectively and upon the opposed wall of the housing are reinforcing projections 15 and 16 likewise running entirely across the wall of the housing.

Horizontally extending openings 17 and 18 are formed through the enlargements 15 and 16 respectively and upon each side wall of the housing with their upper faces in the plane of the lower wall of the openings 17 and 18 respectively are inwardly projecting flanges 19 and 20 which form ledges or supports for plates 21 and 22 that extend through the openings 17 and 18 and are adapted to reciprocate across the interior of the housing 2, the plate 22 forming a gate or valve closure across the area between the delivery chute 3 and the measuring chamber 5 and the plate 21 constituting a gate or valve closure between the lower portion of the measuring chamber 5 and the delivery passage 6. The inner end of each of the plates 21 and 22 is outwardly beveled and is arranged to fit closely against the downwardly beveled portion of the flanges 13 and 14 respectively.

The plate 21 has an outward extension 23 in which there is formed an opening 24 and the plate 22 has a similar extension 25 having an opening 26 therein. From the upper part of the housing, there is an outwardly extending bracket 27 to which there is pivoted a downwardly extending link 28 having a rounded extremity 29 that operates in the opening 24 of the extension 23 of the plate 21, the upper end of said link 28 being pivotally secured to the outer end of the bracket 27 by a bolt or pivot pin 30.

From the lower portion of the housing and extending outwardly is a bracket 31 to which there is pivoted a link 32 having a rounded extremity 33 that operates in the opening 26 of the extension 25 of the plate 22, the opposite extremity of said link 22 being pivotally secured to the outer end of the bracket 31 by a bolt or pivot pin 34. The extremities of the brackets 23 and 25 are in laterally spaced planes so that the links 28 and 32 lie in spaced parallel planes at approximately the center of the side wall of the housing.

The mechanism for operating the plates 21 and 22 is designed to intermittently move the plates 21 and 22 to positions to open and close the passages that they control. The mechanism includes spaced cam wheels 35 and 36 mounted on a power shaft 37 at a spaced interval, which is journaled in bearings 38 and 39 carried respectively by brackets 40 and 41 secured to the base plate 1. The power shaft 37 is equipped with any suitable power transmission wheel, such, for instance, as a sprocket wheel 42 whereby the shaft 37 may be driven at controlled speeds from any suitable source of power. Upon the inner face of each of the cam wheels 35 and 36 is a cam slot 43 and 44 respectively, said cam slots each having a depression or low area, said low areas being diametrically opposed. The cam slots in the respective cam wheels are designed to cooperate with connecting rods for operating the links 28 and 32 respectively. The construction of the connecting rods is duplicate and is shown in plan view in Fig. 4.

Each of the operating rods comprises a central plate 45 having a strap 46 that fits over the shaft 37. Forward of the portion 45 is an offset portion 47 in which there is an oblong opening 48. In forward extension of the portion 47 is a cylindrical portion 49 forming a guide rod. Between the strap portion 46 and the portion 45 is a cam roller 50. The operating rods are arranged in spaced relationship with the angular portions 47 opposed and extending outwardly. The internal area formed by the walls of the angular portions 47 constitutes an opening through which the spaced links 28 and 32 extend. Each of the links 28 and 32 carries a pin 51 that extends through the respective openings 48, each of said links being held in association with its respective connecting rod by means of said pins. Lateral displacement of each link in respect of its pin is prevented by a cotter pin or key 52. The forward cylindrical portion 49 of each of the operating rods extends into an alined opening 53 formed at a spaced interval in a flange or projection 54 on the side wall of the housing 2.

From the foregoing description of the construction and assembly of the parts, it will be understood that upon each rotation of the shaft 37, and as one of the cam rollers rides in the depressed portion of the cam slot, the corresponding connecting rod will be drawn inwardly, rocking its connecting link outwardly from the housing and by its connection with the respective one of the plates 21 or 22, will move the plate to open position. Inasmuch as the depressed portions of the cam slots are oppositely disposed, there will be one complete reciprocation of each of the plates 21 and 22 for each cycle of the cam wheels. Thus it will appear that the plate 22 is drawn to open position, remains open for a predetermined interval and is then closed, the material passing from the delivery chute 3 into the measuring chamber 5. The plate is then moved to closed position and upon a timed interval, the plate 21 is moved to open position, remains open for a predetermined period and is closed. Thus, measured quantities of material are fed to the measuring chamber and discharged from the measuring chamber. By the formation of the depressed portion of the cam slots, the time or interval during which each of the plates 21 and 22 is at open position may be determined and the speed of the intermittent opening and closing of the gates or valve openings between the delivery chute and the measuring chamber and between the measuring chamber and the outlet opening or passage may be accurately timed. Any suitable design of hopper 55 may be provided in connection with the delivery chute of the apparatus, or the delivery chute may, by suitable connections, be communicated with storage bins or other source of bulk supply.

I am aware that the invention may be modified in various particulars without departing from the spirit and scope thereof.

What I claim and desire to secure by Letters Patent is:

1. A measuring device comprising a housing having an opening in one side thereof, a pair of spaced plates mounted in said housing and forming a measuring chamber between them, one of said plates being opposite said opening, a hinged wall in said opening adapted to be moved outwardly by pressure of material actuated by said plate which is opposite said opening, and mechanism for reciprocating said plates to open and to close the passage to said measuring chamber and to open and to close the outlet from said chamber.

2. A measuring device comprising a housing having an opening in one side thereof, a pair of spaced plates mounted in said housing and forming a measuring chamber between them, one of said plates being opposite said opening, a hinged wall in said opening adapted to be moved outwardly by pressure of material actuated by said plate which is opposite said opening, a flange on said wall having a surface matching and opposite the end of said last named plate, and mechanism for reciprocating said plates whereby each is moved to an open and to a closed position while the other remains in a closed position.

3. A measuring device comprising a delivery chute having an opening in one wall thereof, a pair of spaced gates in said chute forming a measuring chamber between them, one of said gates being opposite said opening, a wall hinged to said chute for opening and closing said opening and arranged to be moved to open position by pressure of material moved by said gate which is opposite said opening, a rotary shaft, levers pivoted to said plates, rigid supports on which said levers are pivoted, and mechanism operated by said shaft for oscillating said levers to move one of said gates from and to closed position while the other gate remains closed.

4. A measuring device comprising a delivery chute, a pair of spaced gates supported for movement across said chute, a rotary shaft, a pair of cams rigid on said shaft, a connecting rod operated by each of said cams, a pair of stationary supports, a pair of levers each having one end pivoted on one of said stationary supports and each having its opposite end engaging one of said gates, and a connection between each of said levers and one of said connecting rods whereby said gates will be moved across said chute which said connecting rods are operated by said cams.

5. A measuring device comprising a delivery chute, a pair of spaced gates in said chute forming a measuring chamber between them, a rotary shaft, a pair of cams rigid on said shaft, a pair of connecting rods each having one end supported by said shaft for sliding movement by said cams, means for sliding said connecting rods by said cams, and means operated by said connecting rods for moving said gates across said chute to open and to close said chute.

6. A measuring device comprising a delivery chute, a pair of spaced gates supported for sliding movements across said chute, a rotary shaft, a pair of cams rigid on said shaft, a pair of connecting rods each having one end supported by said shaft for sliding movements by one of said cams, a support for the opposite end of each of said connecting rods, means for moving said connecting rods longitudinally by said cams, stationary supports, a pair of levers each having one end pivoted on one of said stationary supports and having its opposite end engaging one of said slides, and connections for operating said levers by said connecting rods to cause said levers to move said slides across said chute.

HERMAN S. ALBRECHT.